Figure 1:
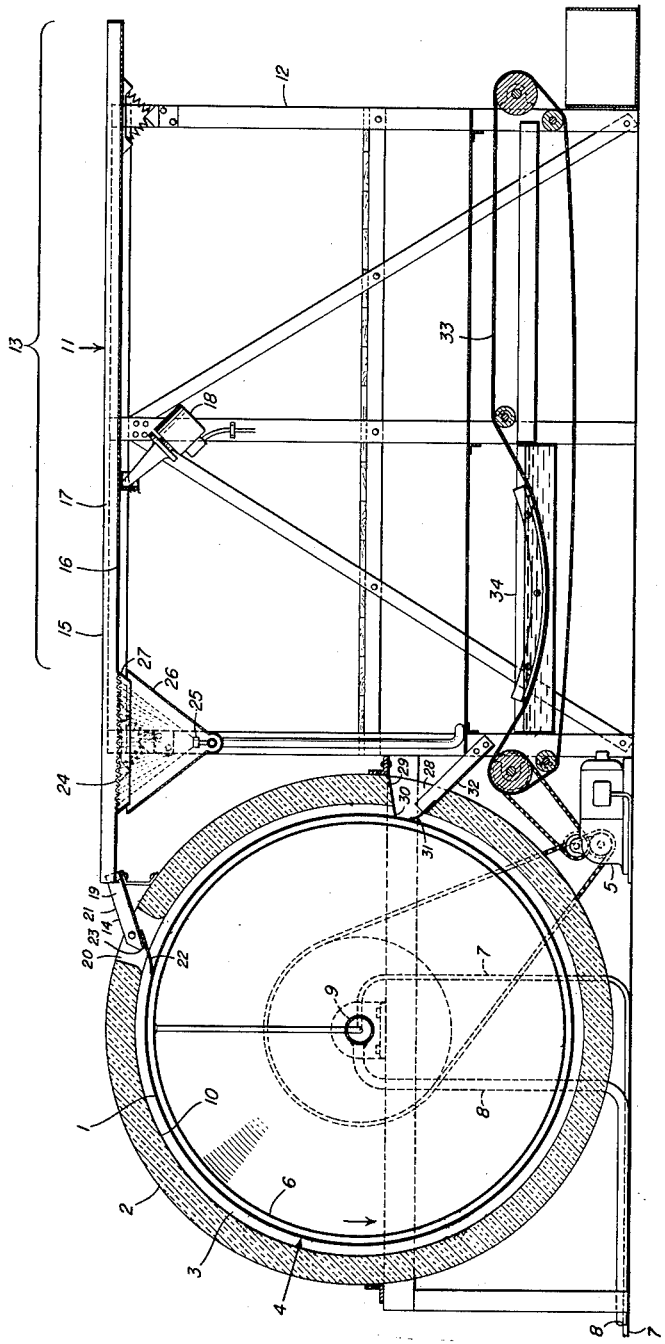

Inventor:
Amaziah F. Wentworth

United States Patent Office

3,048,987
Patented Aug. 14, 1962

3,048,987
QUICK FREEZING APPARATUS
Amaziah F. Wentworth, 411 Albion Ave.,
Fairmont, Minn.
Filed July 23, 1959, Ser. No. 829,076
5 Claims. (Cl. 62—346)

This invention relates to apparatus for freezing comestibles and has for its primary object the provision of apparatus for individually quick freezing comestibles, whereby comestibles are applied automatically and without pressure to an internally refrigerated movable surface to which each adheres during freezing.

Another object of the invention is to provide apparatus for individually frezing comestibles, whereby comestibles are automatically applied from above and without pressure caused individually to adhere to an internally refrigerated surface on which they are carried during freezing.

An additional object of the invention is to provide apparatus for individually freezing comestibles, whereby comestibles are positively fed from above onto an internally refrigerated movable surface and present to the surface the same surface on which each rested during its feeding thereto.

A further object of the invention is to provide apparatus for individually freezing comestibles, wherein comestibles are automatically applied from above and without pressure to an internally refrigerated surface movably mounted in an insulated casing through an opening in the casing so disposed as to require no flaps or other sealing means to render it practically self-sealing against loss of refrigeration.

Another object of the invention is to provide apparatus for individually freezing comestibles, wherein comestibles are positively fed from above onto an internally refrigerated movable surface by a combined vibrator conveyor and gravity slide feed and in process may be moistened, as required, to lubricate them for sliding and to individually bond them to the surface substantially on contact therewith.

An additional object of the invention is to provide apparatus for individually freezing comestibles, wherein comestibles are fed from above, automatically and without pressure, onto an internally refrigerated movable surface and detached therefrom, after freezing, for discharge into a glazing medium by blunt means disposed sufficiently close to the surface to prevent shearing, thereby avoiding possible damage during freezing even to readily rupturable comestibles.

Other objects and advantages will appear hereinafter in the detailed description, be particularly pointed out in the appended claims and be illustrated in the accompanying drawings, in which:

FIGURE 1 is a side elevational view of a preferred embodiment of the quick freezing apparatus of the present invention, with portions broken away and shown in section to more clearly illustrate certain of the details of construction.

Referring now in detail to the drawings, in which like reference characters designate like parts, the quick freezing apparatus of the present invention is adapted for individually quick freezing any comestible suitable for quick freezing and having a generally or substantially flat side, face or area. However, it is peculiarly adapted for freezing citrus fruit sections which have the requisite substantially flat areas but are readily rupturable under pressure in the unfrozen state. Readily handleable by the present apparatus in which each comestible rests on the same side during both feeding and freezing, citrus fruit sections, especially, present difficulty in bottom feeding apparatus, such as that disclosed in Carpenter application Serial No. 770,741, filed October 30, 1958, because of their relatively inclined sides and the consequent necessity of special propping to align their presented sides with the surface on which they are to be frozen.

As do the apparatuses of Carpenter's above application and application Serial No. 642,478, filed February 26, 1957, the apparatus of this invention freezes comestibles on an internally refrigerated surface 1 movably mounted in an insulated casing or housing 2, enclosing or containing a freezing chamber or compartment 3 through which comestibles are carried on the surface 2. Conveniently forming all or part of the peripheral surface or side of a drum 4 mounted in the housing 2 and rotatable either intermittently or continuously by a suitable drive 5, the internally refrigerated surface 1 may be one of a plurality of flat sides, as in the disclosed embodiment of the later Carpenter application, but preferably is a continuous or endless, uninterrupted cylindrical surface, as in that of the earlier Carpenter application. In either case, the primary refrigerant may be circulated through the hollow side wall 6 of the drum of which the surface 1 forms the outer surface, by connecting the wall interiorly with supply and return leads 7 and 8, respectively, to a compressor system (not shown) through a connection of the sealed swivel type (not shown) in one or each of the stub axles 9 of the drum.

Here, the annular space between the refrigerated surface 1 and the confronting inner side wall 10 of the preferred cylindrical housing 2, the freezing chamber 3 or at least the surface 1 desirably is adapted to be maintained at a temperature of around —35° F. or lower by using a cascade compressor system such as described in the later Carpenter application.

For feeding citrus fruit sections or other comestibles to the surface 1, there is provided a feed conveyor 11 supported or mounted on a frame, stand or support 12 at a level to feed from above onto the surface 1 and preferably above the drum. Of a length to include a loading station 13 sufficient in extent to accommodate manual or mechanical loading at a rate to meet the peak demand of the drum 4, the feed conveyor 11 conceivably could be inclined downwardly toward and feed directly onto the drum over a suitable transition element. However, it is preferred that the feed conveyor be substantially level and that it discharge onto a slide or chute 14 over which the comestibles will slide by gravity from the conveyor onto the drum surface 1.

A particularly suitable form of feed conveyor is the illustrated vibrator conveyor 11, the trough or tray 15 of which is spring mounted on the frame 12 and has a flat floor or platform 16 on which comestibles are loaded, flat face or side down, at the loading station 13. The trough 15 has a marginal flange or wall 17 upstanding from and enclosing the sides and outer or far end of the floor 16 to contain comestibles loaded thereon and to facilitate cleaning is made of stainless steel or like non-corrosive material. Vibrated, conveniently from below, by a solenoid-actuated or other suitable rectilinear vibrator 18 and with the vibrator, for the preferred level floor 16, inclined forwardly toward the drum 4 so that the vibrations impart a forward as well as an upward force to the floor, the trough 15 positively moves or feeds comestibles loaded on it toward the drum 4.

Rather than feed directly to the drum 4, the feed conveyor 11, as previously stated, preferably feeds onto the slide 14. Extending at its inlet end under the conveyor's floor 16 and, like the latter, enclosed at its sides by upstanding marginal flanges 19 to contain the comestibles, the slide 14 may be mounted or supported on the frame 12 and casing 2 and projects or extends through a feed or inlet slot or opening 20, in or interrupting the side wall 10 of the casing, into the freezing chamber 3. Overlying, overlapping or projecting or extending over the internally refrigerated surface 1 on the drum 4, the slide 14 preferably is formed of a rigid main portion 21, made of stainless steel or like non-corrosive material, which terminates short of the surface 1 and has as its outlet or discharge end portion a flexible transition element, lip or flap 22 of rubber or like material which conveniently may be bonded or otherwise secured to the underside of the main portion 21 and, therebeyond, slidingly engages or contacts the surface. Substantially tangential to the internally refrigerated surface 1 and with the balance of the slide 14 and the feed conveyor 11 substantially coextensive in width with the surface, the lip 22 enables comestibles to be slid down the slide directly onto the surface with each presenting thereto the same face or side on which it was laid on the feed conveyor at the loading station 13 and rested during feeding over the conveyor and the slide.

With the feed conveyor 11 and slide 14 disposed to feed or apply individual comestibles, same sides down, from the loading station 13 from above onto the internally refrigerated surface 1, the feed slot 20 is enabled to be formed within the upper portion or part of the wall 10 of the casing 2 at or adjacent its top. This disposition of the feed slot 20 in turn permits its outer end 23 to be wholly above the upper extremity of the freezing chamber 3 with the result that the slot, despite being open and of an extent, axially or transversely and circumferentially of the casing 2, to accommodate the slide 14, is practically self-sealing against loss of refrigeration.

Like those of the Carpenter applications, the freezing apparatus of this invention depends on surface moisture on the comestibles which, at the low temperature of the internally refrigerated surface 1, freezes substantially on contact therewith for bonding, adhering or freezing the comestibles to the surface as they are carried thereon through the freezing chamber 3. This same moisture in the liquid state is here used, as well, as a lubricant to facilitate sliding of the commestibles down the slide 14 and thus enable the inclination of the slide to be less than would be necessary to exceed the angle of repose of most comestibles if the latter were fed dry onto it.

Essential at the drum 4 and desirable on the slide 14, the presence of surface moisture on the comestibles would tend to interfere with their feeding by the feed conveyor 11, particularly if the latter is in the form of the preferred vibrator conveyor. It therefore is desirable that the comestibles be relatively dry when loaded on the feed conveyor and that the critical moisture be applied to their undersides or underfaces immediately prior to their discharge from the conveyor onto the slide 14. This is here accomplished by providing the floor 16 of the trough 15 with a perforated or foraminous discharge end portion 24 conveniently in the form of a stainless steel or like noncorrosive wire screen inset into and extending the width of the otherwise solid floor. Mounted on the frame 12 below the foraminous portion or screen 24 are one or more nozzles or spray heads 25, each disposed to direct a jet or spray of water upwardly through the screen onto the undersides of comestibles as they move across the screen incident to vibration of the trough 15. Both to contain the moisture and catch and draw off any excess, the spray head or heads 25 are enclosed in an upwardly opening funnel or hood 26 which may be of inverted V-shape and extend upwardly substantially to and embrace or surround a down-turned marginal skirt or flange 27 bounding the edges of the screen 24.

Rotating continuously during operation of the apparatus in a counterclockwise direction as viewed in FIGURE 1, the drum 4, as the comestibles are fed to it, carries them on its internally refrigerated surface 1 through the freezing chamber 3. With the rate of rotation of the drum such, relative to its diameter and the temperature of the surface 1, that the comestibles will be frozen before they again reach the feed slot 20, there is provided in the casing 2, circumferentially spaced thereabout from and in advance of the feed slot, a discharge or outlet slot 28 which also extends axially of the casing for substantially the width of the drum 4. For detaching the frozen comestibles from the internally refrigerated surface and discharging them through the discharge slot 28, there is mounted on or attached to the casing at the upper side of the discharge slot a breaker or detaching bar or blade 29 which projects at a downward incline into the chamber 3 and has a blunt edge 30 spaced from but disposed or lying closely adjacent or proximate to the peripheral surface 1 so as to contact or tap the comestibles and thus break their ice bonds with the surface without shearing even such relatively delicate comestibles as citrus fruit sections.

Carrying on its lower side a rubber or like flexible sealing flap 31 which yields to pass comestibles to the breaker bar 29 but otherwise, with the latter, serves to seal it off from the freezing chamber 3, the discharge slot 28 may also have on that side a discharge chute 32 leading downwardly therefrom onto a discharge conveyor 33 by which the frozen comestibles are discharged from the apparatus, the discharge conveyor being of the endless belt or other suitable type and readily driven off the motor drive 5. Conveniently mounted on the frame 12 below the feed conveyor 11 and with the discharge slot 28 correspondingly formed in the frame-confronting portion or side of the casing 2, the discharge conveyor 33, here, not only discharges the frozen comestibles, but enables them to be glazed in process by conducting them during discharge through a tank 34 supported on the frame 12 and containing a glazing solution suitable for the particular comestibles being frozen.

Constructed in the above manner, the apparatus, once comestibles are loaded onto the feed conveyor 11, will automatically and, as desired, either continuously or intermittently feed the comestibles on the side or face on which they are placed on the floor 16 of the feed conveyor to the internally refrigerated surface 1 with the comestibles there presenting the same underside or face for freezing to the surface, carry them on that surface through the freezing chamber 3 and, as they are frozen, detach them from the surface by the breaker bar 29 and deposit them on the discharge conveyor 33 by which the frozen comestibles are discharged and in process glazed. Applying no pressure to the comestibles in their unfrozen state and instead depending on gravity and the freezing of their surface moisture substantially on contact with the internally refrigerated surface 1 to cause them to adhere to that surface, the apparatus of this invention, while suitable for quick freezing any comestible having a flat area of sufficient extent for the developed ice bond to hold it to the surface, is peculiarly suited for quick freezing citrus fruit sections and like comestibles which, in their unfrozen state, are readily rupturable.

It should be understood that the described and disclosed embodiment is merely exemplary of the invention and that all modifications are intended to be included which do not depart from either the spirit of the invention or the scope of the appended claims.

Having described my invention, I claim:

1. Apparatus for individually freezing comestibles comprising an insulated casing, a rotatable drum within said casing, an internally refrigerated surface on a side of said drum, a feed opening in an upper portion of said casing and open to atmosphere, a feed chute projecting through said opening and inclined downwardly toward and at least partially overlying said surface, flexible transition means forming a discharge end portion of said chute and slidingly contacting said surface, a feed conveyor for positively feeding individual comestibles from a loading station onto said chute, said comestibles sliding down said chute directly onto said surface and without pressure bonding thereto substantially on contact by freezing of moisture on undersides thereof presented to said surface, and means associated with said feed conveyor for moistening said undersides of comestibles thereon in advance of feeding thereof onto said chute.

2. Apparatus for individually freezing comestibles comprising an insulated casing, a rotatable drum within said casing, an internally refrigerated surface on a side of said drum, a feed opening in an upper portion of said casing and open to atmosphere, a feed chute projecting through said opening and inclined downwardly toward and at least partially overlying said surface, flexible transition means forming a discharge end portion of said chute and slidingly contacting said surface, a feed conveyor for positively feeding individual comestibles from a loading station onto said chute, said comestibles sliding down said chute directly onto said surface and without pressure bonding thereto substantially on contact by freezing of moisture on undersides thereof presented to said surface, said feed conveyor having a foraminous discharge end portion, and jet means disposed below said end portion for directing a spray therethrough against and moistening undersides of said comestibles in advance of feeding thereof onto said chute.

3. Apparatus for individually freezing comestibles comprising an insulated casing, a rotatable drum within said casing, an internally refrigerated surface on a side of said drum, a feed opening in an upper portion of said casing and open to atmosphere, a feed chute projecting through said opening and inclined downwardly toward and at least partially overlying said surface, flexible transition means forming a discharge end portion of said chute and slidingly contacting said surface, and a vibrator conveyor for positively feeding individual comestibles from a loading station onto said chute, said comestibles sliding down said chute directly onto said surface and without pressure bonding thereto substantially on contact by freezing of moisture on undersides thereof presented to said surface.

4. Apparatus for individually freezing comestibles comprising an insulated casing enclosing a freezing chamber, a drum rotatably mounted with said chamber and having an uninterrupted internally refrigerated side surface, an unsealed feed slot in an upper portion of said casing and having an outer end open to atmosphere and disposed wholly above said freezing chamber, an inclined feed chute projecting through said opening downwardly toward said surface and having a flexible discharge end portion in contact therewith, a vibrator conveyor for positively feeding individual comestibles from a loading station onto said chute and having a foraminous discharge end portion, spray means for spraying moisture upwardly through said foraminous end portion and moistening undersides of said comestibles in advance of feeding thereof onto said chute, a discharge opening in and spaced circumferentially about said casing from said feed opening, and a breaker bar mounted on said casing and having a blunt edge disposed loosely adjacent said surface for detaching frozen comestibles therefrom for discharge through said discharge opening.

5. Apparatus for individually freezing comestibles comprising an insulated casing enclosing a freezing chamber, a drum rotatably mounted within said casing and having an uninterrupted internally refrigerated side surface, an unsealed feed slot in an upper portion of said casing and having an outer end open to atmosphere and disposed wholly above said freezing chamber, an inclined feed chute projecting through said opening downwardly toward said surface and having a flexible discharge end portion in contact therewith, a vibrator conveyor for positively feeding individual comestibles from a loading station onto said chute and having a foraminous discharge end portion, a stand supporting said conveyor, spray means on said stand for spraying moisture upwardly through said foraminous end portion against and moistening undersides of said comestibles in advance of feeding thereof onto said chute, a discharge opening in and spaced circumferentially about said casing from said feed opening and facing toward said stand, a discharge conveyor supported on said stand below said vibrator conveyor and discharge opening, a breaker bar attached to said casing and having a blunt edge lying closely adjacent said surface for detaching frozen comestibles therefrom for discharge through said discharge opening onto said discharge conveyor, and tank means containing a glazing solution mounted on said stand in the path of said discharge conveyor for glazing said comestibles during discharge thereof.

References Cited in the file of this patent
UNITED STATES PATENTS

| 1,965,619 | Vogt | July 10, 1934 |
| 2,145,393 | Hergert | Jan. 31, 1939 |
| 2,478,465 | Dodson | Aug. 9, 1949 |
| 2,697,463 | Desrosier | Dec. 21, 1954 |
| 2,751,687 | Colton | June 26, 1956 |